(12) United States Patent
Bergh et al.

(10) Patent No.: US 10,847,052 B2
(45) Date of Patent: Nov. 24, 2020

(54) MOTION TRAINING AID

(71) Applicant: West & Bergh IT Consulting AB, Höllviken (SE)

(72) Inventors: Christian Bergh, Höllviken (SE); Markus Westerberg, Höllviken (SE); Ulf Bering, Ramlösa (SE)

(73) Assignee: WEST & BERGH HOLDING AB

( * ) Notice: Subject to any disclaimer, the term of this patent is extended or adjusted under 35 U.S.C. 154(b) by 242 days.

(21) Appl. No.: 15/757,878

(22) PCT Filed: Jun. 2, 2017

(86) PCT No.: PCT/EP2017/063495
§ 371 (c)(1),
(2) Date: Mar. 6, 2018

(87) PCT Pub. No.: WO2017/207772
PCT Pub. Date: Dec. 7, 2017

(65) Prior Publication Data
US 2018/0336797 A1    Nov. 22, 2018

(30) Foreign Application Priority Data

Jun. 3, 2016 (EP) .................................... 16172927

(51) Int. Cl.
*G09B 19/00* (2006.01)
(52) U.S. Cl.
CPC .............................. *G09B 19/0038* (2013.01)
(58) Field of Classification Search
CPC ................ G09B 19/00; G09B 19/0038; G09B 19/020038; G09B 9/00
See application file for complete search history.

(56) References Cited

U.S. PATENT DOCUMENTS 5,919,149 A * 7/1999 Allum .................. A61B 5/1116
600/595
6,778,866 B1  8/2004 Bettwy
(Continued)

FOREIGN PATENT DOCUMENTS

GB           2462780 A     2/2010

OTHER PUBLICATIONS

International Search Report for corresponding international application No. PCT/EP2017/063495, dated Sep. 7, 2017.

*Primary Examiner* — Timothy A Musselman
(74) *Attorney, Agent, or Firm* — Tarolli, Sundheim, Covell & Tummino LLP

(57) ABSTRACT

A motion training aid system comprises
  a motion sensor unit attachable to a body part of the person or to an implement used by said person;
  a processor;
  a stimulator attachable to the body of the person, and upon receiving a command, capable of eliciting a stimuli perceptible by the person;
wherein the motion sensor unit is configured to provide motion data to the processor, and the processor determines, based on the motion data subsequent three dimensional positions of the motion sensor unit;
wherein the processor is configured to compare the motion sensor unit position, with a reference track, and depending on the motion sensor unit position relative to the first three dimensional track, send to the stimulator, a command to elicit a stimulus when the motion sensor unit has reached a predefined deviation from the reference track and wherein the stimulus is an electrical stimulus.

10 Claims, 11 Drawing Sheets

(56) References Cited

U.S. PATENT DOCUMENTS

| | | |
|---|---|---|
| 7,602,301 B1 | 10/2009 | Stirling et al. |
| 9,173,596 B1 | 11/2015 | Berme et al. |
| 9,610,476 B1 * | 4/2017 | Tran ................. A42B 3/046 |
| 2013/0089843 A1 | 4/2013 | Hutchison |

* cited by examiner

MOTION TRAINING AID

RELATED APPLICATIONS

The present invention is a U.S. National Stage under 35 USC 371 patent application, claiming priority to Ser. No. PCT/EP2017/063495, filed on 2 Jun. 2017; which claims priority of EP 16172927.2, filed on 3 Jun. 2016, the entirety of both of which are incorporated herein by reference.

TECHNICAL FIELD

The present invention relates to the field of training aids, i.e., devices that helps a person or animal better perform some activity of that person or animal. More particularly the present invention relates to motion training aids, i.e., systems or devices that provide some kind of feedback relating to a motion performed by the user. Even more particularly it relates to sports movements training aids, such as e.g. golf swing or javelin training aids.

PRIOR ART

One example of such a motion training aid is known from WO2003024544. It discloses a repetitive motion feedback system is provided with various sensors and devices for monitoring aspects of a repetitive motion sequence, such as a golf swing. The monitored aspects can include motion properties of an object moved by the user, position properties of the user and motion properties of the user. A data processing system for receiving data of the monitored aspects provides feedback data that is provided to a feedback output device, such as a graphical display device or speaker, so that the user is provided with feedback regarding the repetitive motion sequence. In one particular embodiment, the user's performance is compared to a template of a prior performance, with feedback being provided regarding the differences.

Another prior art document is U.S. Pat. No. 6,778,866 disclosing a method and apparatus for teaching a person how to perform a specific body motion in a consistent manner is based on electronically measuring one or more parameters of an actual body motion, comparing the one or more measured parameters with corresponding parameters of a target body motion, and providing a sensible feedback to the user based on a degree of correspondence between the one or more measured parameters and the corresponding target parameters. In a particular embodiment, the feedback is audible. More specifically the feedback is a musical tune that has a particular characteristic (such as rhythm) that is particularly suited to a particular body motion (such as a golf swing). The feedback may be in the form of electronically causing the musical tune to go off-key in proportion to a discrepancy between the actual body motion and the target body motion.

A further prior art system and method for teaching ergonomic motion of an athlete, for example a golfer is disclosed in WO200518759. The system including the video camera for capturing successive image of the golfer executing a preferring golf swing and a threshold definition system that allows the golfer define a spatial region of the video image. If the spatial region is intruded upon, an alarm is actuated, thereby providing feedback so the golfer may alter the technique of the next attempted motion. For example, the golfer may define the region such that if the club moves off plane during a swing, a tee removal system causes the ball to disappear. In this manner, the golfer is only able to hit the ball when the club stays on plane.

SUMMARY OF THE INVENTION

The inventors have realised that a person or animal trying to improve a complex motion like e.g. a golf swing, a figure skating jump or a discus throw often have problems to correct the faulty portions of the movement, and/or to replace these faulty portions with more effective ones. Also the person's coach, even though equipped with advanced training aids such as video recording equipment may find it difficult, and/or time consuming to help the person improving his or her motion. The training aid enables the user to learn new movement patterns also on a subconscious level that creates learning free from the conscious analytical mind. This in turn makes the new movement pattern sustainable under pressure.

Biofeedback

According to a first aspect, in order to provide a device to solve these drawbacks, the present invention provides a system for providing a person or animal, who desires to perform or improve a bodily movement, with biofeedback relating to said movement.

The system comprises a sensor unit configured to be easily attachable to a body part of the person or animal or to an implement used by said person or animal;

a control unit, or communication means facilitating communication with a control unit;

a processor;

a memory;

a stimulus unit attachable to the body of the person or animal, and capable of eliciting a stimuli perceptible by the person or animal;

wherein the sensor unit is provided with one or more sensors capable of providing motion data to the processor, the processor being configured to keep track of subsequent three dimensional positions of the sensor unit;

communication means enabling the processor to communicate with the control unit;

wherein the processor is configured to supervise the motion by comparing the sensor unit position, as tracked, with a predetermined reference track, and depending on the sensor unit position relative to the reference track, immediately send, to the stimulus unit a command to elicit a first stimulus, or a first signal, when the sensor unit has moved away more than the maximum allowable deviation from the reference track, and wherein the stimulus elicited by the stimulus unit is an electric stimulus.

Further, and additionally, the processor preferably is configured to be able to be set in at least two alternate modes:

a threshold set mode, wherein a reference track can be defined together with a threshold distance or maximum allowable deviation distance;

a supervision mode, wherein the motion is supervised as described above.

According to a second aspect there is provided a method for a training aid for a person or animal provided with a motion sensor unit, in order to improve a body motion, the method comprising the steps of receiving motion sensor unit data;

determining the current position of the sensor unit based on sensor unit data;

comparing the current motion position values of the sensor unit as determined with corresponding position values of a predetermined desired motion;

issuing a stimulus based on the level of disagreement between the position values of the current motion and of the predetermined desired motion;

wherein the stimulus issued is an electric stimulus.

Angle of rotation, sensor directional vector

According to a third aspect there is provided a system and a method for providing a person or animal, who desires to perform or improve a bodily movement, with biofeedback relating to said movement a sensor unit configured to be easily attachable to a body part of the person or animal or to an implement used by said person or animal;

a control unit that may be handheld;

a processor;

a memory;

a stimulus unit attachable to the body of the person or animal, and capable of eliciting a stimuli perceptible by the person or animal;

wherein the sensor unit is provided with one or more sensors capable of providing motion data to the processor, the processor being configured to keep track of subsequent three dimensional positions of the motion sensor unit; and of attitude angles of said sensor unit communication means enabling the processor to communicate with the control unit, and wherein the processor is configured to compare the sensor unit position, as tracked, and/or the directional vector of the sensor unit with a predetermined reference track, and/or predetermined directional deviation cones, respectively, and depending on the sensor unit position relative to the reference track, and/or depending on the sensor unit direction relative to the predetermined cones, immediately send, to the stimulus unit a command to elicit a first stimulus, or a first signal, when the sensor unit has moved away more than the maximum allowable deviation from the reference track, and/or the sensor unit has assumed an attitude of motion (orientational direction in space, pitch/yaw/roll) outside preset limits and wherein the processor may be configured to be able to be set in one of at least two alternate modes:

a threshold set mode, wherein a reference track can be defined together with a threshold distance or maximum allowable deviation distance; and/or also specifying limitations of directional deviation of the directional vector of the motion sensor unit during a motion.

a supervision mode, wherein the processor compares the sensor unit position, as tracked, and/or the directional vector of the sensor unit with the reference track, and/or predetermined directional deviation cones, respectively, and depending on the sensor unit position relative to the reference track, and/or depending on the sensor unit direction relative to the predetermined cones, immediately send, to the stimulus unit a command to elicit a first stimulus, or a first signal, when the sensor unit has moved away more than the maximum allowable deviation from the reference track, and/or the sensor unit has assumed an attitude of motion (direction in space, pitch/yaw/roll) outside predetermined limits, and wherein the stimulus elicited by the stimulus unit may be an electrical stimulus

BRIEF DESCRIPTION OF THE DRAWINGS

In order that the manner in which the above recited and other advantages and objects of the invention are obtained will be readily understood, a more particular description of the invention briefly described above will be rendered by reference to specific embodiments thereof which are illustrated in the appended drawings.

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Definitions

Figure 1A:
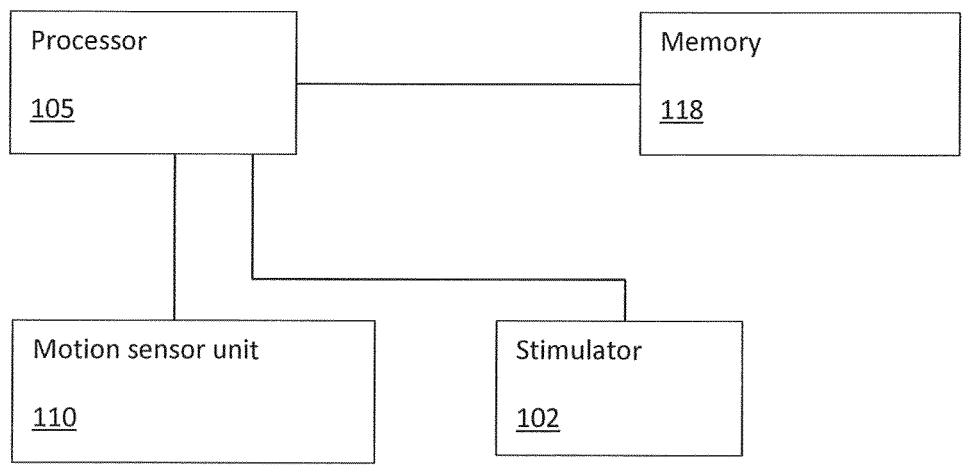
FIG. 1a shows a block diagram of a biofeedback device according to an embodiment of the present invention.

For the purpose of the present invention, and in the following text, the following terms are used with the meaning as explained below.

"Motion": With the term "motion" is understood any body movement, performed by a user, composite or simple, may it be a movement of one or more of his or her extremities, or torso, or centre of gravity. Any possible ambiguities should be solved by the context in which the term is used. Example motions include, but are not limited to, portions of or complete high jumps, pole vaults, hammer throws, javelin throws, gymnastics, choreography moves, cheerleading moves, baseball battings, baseball pitching, golf swings, putting strokes, or horse jumps. In various embodiments motion also includes rotational movement.

"Motion representation": A "motion representation" is a usually mathematical representation of a motion. The motion representation may include representations of linear and rotational motion position, motion velocity, and motion acceleration. For example, the motion may be represented by the current position of a predetermined point on the body of a user, or the motion may be represented by a (motion) track, see below.

"Position": With the term "position", as used herein is understood the physical local position of a sensor unit or small object in relation to a nearby reference point, and expressed using a suitable coordinate system. Typically, in the context of the present invention, positions are within the magnitude of 0-5 meters from the reference point.

"Undesired motion": The term "undesired motion" is used to denote a motion that is undesired or comprises an undesired feature as seen from the point of view of the user, and/or his or her coach.

"Body motion tracker": As used herein, the term "body motion tracker" denotes a device or a system, or a piece of computer code when executed capable of tracking one or more predefined points of a user's body over time, based on processed sensor data.

"Tracking": With the term "tracking" is understood the activity of collecting and storing (recording) consecutive positions of one or more predefined points on a user's body during a motion.

"Motion track": With the term "motion track" is meant the result of the tracking activity, i.e., the collective amount of stored consecutive positions of a predefined body point over time, starting at a start point or start time, and ending at a finishing point or finishing time.

"Reference motion track": A "reference motion track" is a desired motion track that can be used to create a model to which motion representations of motions can be compared.

"Rotation angle" or "Angle of rotation": In two-dimensional space the "angle of rotation" is a measurement of the amount, the angle, by which an object is rotated about a fixed point. In three-dimensional space rotation is measured and indicated using angles of rotation about three coordinate axes.

"Predefined body point": With the term "predefined body point" is meant a point on a user's body that has been provided with means for facilitating the tracking of said point, e.g. a sensor unit.

"Attitude": In the context of the present invention the term "attitude" is used to denote an object's orientation (attitude, angular position) in space. The attitude may be represented by pitch, yaw and roll angles or, alternatively, by an attitude vector or axis, and a rotation angle around that vector or axis, i.e. axis-angle representation, cf. Euler's rotation theorem.

"Motion sensor unit": A "motion sensor unit" is understood to be a unit, attachable to a user's body, that are able to deliver motion information, such as accelerations, information making it possible to determine the sensor's attitude and three-dimensional position or changes in the same position during a motion of the user, in a suitable reference system. The sensor unit is conceived to be small and lightweight enough not to interfere with the motion of the user.

"Control unit": In the context of the present invention a "control unit" is a unit comprising a man-machine interface for operating a device, it also usually comprises wireless communication means to communicate with the processor and/or the motion sensor unit.

"Sample": In the context of the present invention the term "sample" is used to denote a calculated state of the motion sensor unit at a particular moment in time, and may include representations of linear and/or rotational: motion position, motion velocity, and motion acceleration as calculated by the processor based on motion sensor data from the motion sensor unit and also based on a reference frame, i.e., a coordinate system. Associated with the sample are a sample number and/or a sample time.

"Processor": In the context of the present invention the term "processor" is used to denote a processor system irrespective if it comprises one or more logical or physical processors, if nothing else is explicitly mentioned.

"Memory": In the context of the present invention the term "memory" is used to denote a memory system irrespective if it comprises one or more logical or physical memories, if nothing else is explicitly mentioned "Stimulator": In the context of the present invention the term stimulator is used to denote a device, attachable to a body of a person or animal, and upon receiving a command, capable of eliciting a stimulus perceptible by that person or animal.

FIG. 1a shows a block diagram of a training aid system according to an embodiment of the present invention. The training aid system comprises a motion sensor unit 110 for providing motion sensor data. The motion sensor unit 110 is configured to be easily attachable to a body part of a person or to an implement used by said person. It could be in the form of e.g. a bracelet or a plaster or attached to the implement. The motion sensor unit 110 is connected to a processor 105 configured to process motion sensor data.

Figure 1B:
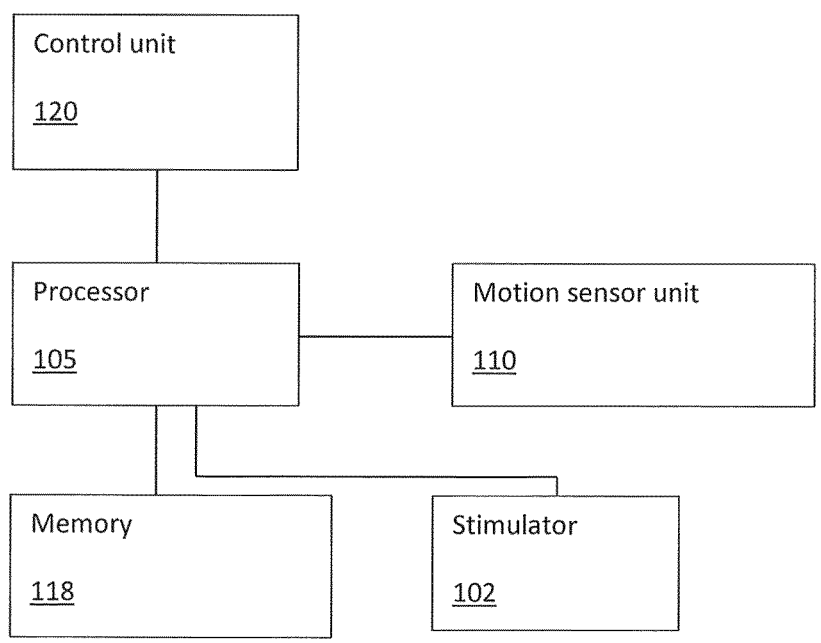
FIG. 1b shows a block diagram of a biofeedback device according to another embodiment of the present invention

The system may comprise a handheld control unit 120 for easy communication with the processor 105, FIG. 1b. The processor is connected to a memory 118 for storing of data. Further, the system comprises a stimulator 102 capable of eliciting a stimulus perceptible by the person. The stimulator 102 is preferably attachable to the body of the person. Preferably the stimulator 102, the processor 105, the memory 118 and the motion sensor unit may all be arranged or integrated in the same physical unit.

Figure 3A:
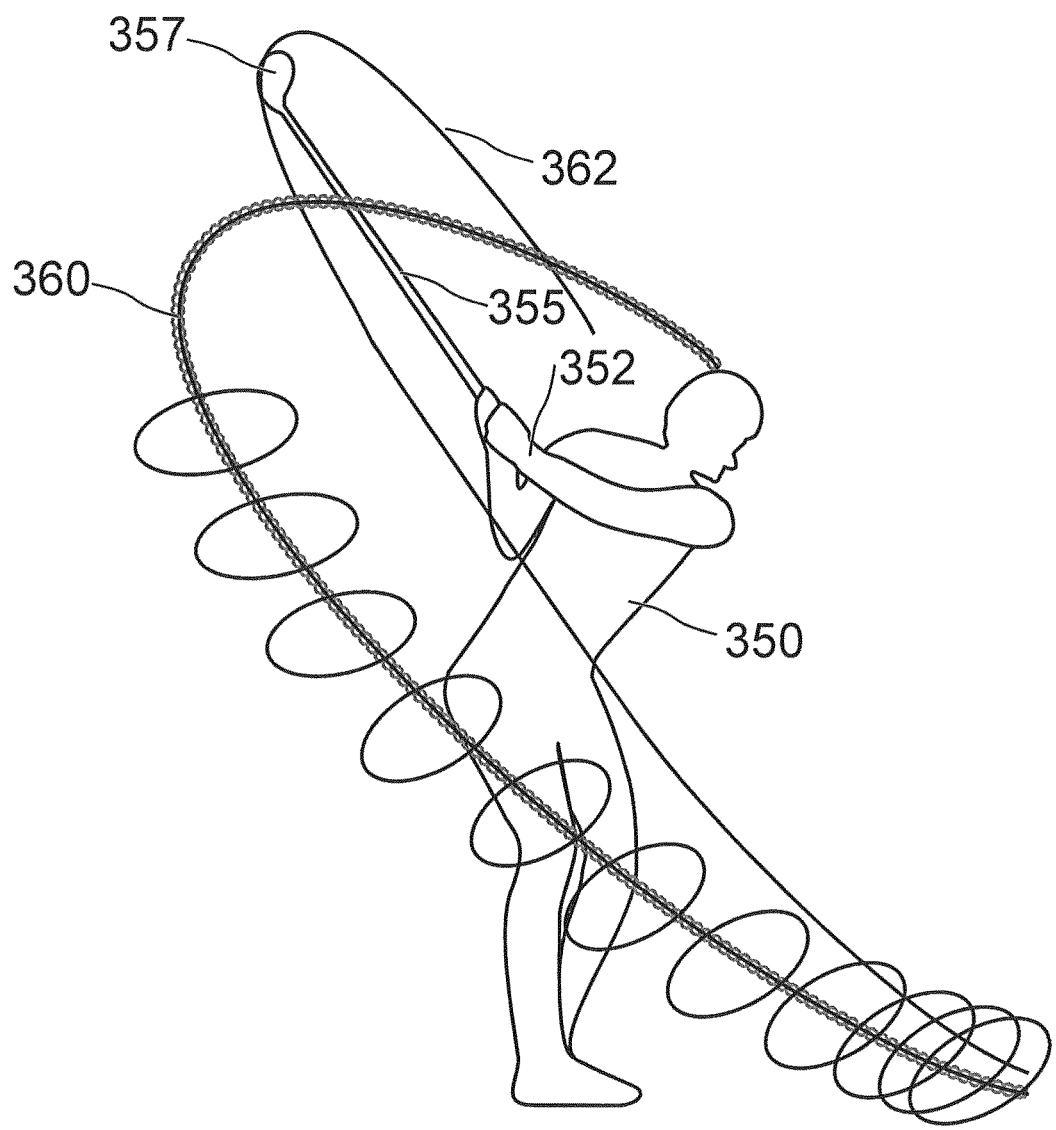
FIG. 3a shows a perspective view of a golfer swinging a club
Figure 3B:
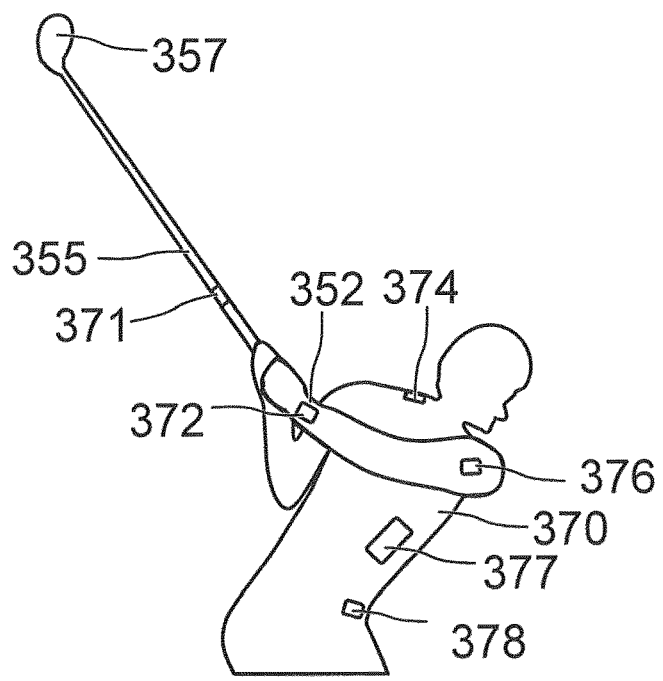
FIG. 3b shows a perspective view of an athlete's body with attached devices.

FIG. 3b shows a perspective view of an athlete's body 350 with attached devices. A bracelet 372 with a motion sensor unit is shown attached to the athlete's wrist 352. A stimulator unit 374 is shown attached to the athlete's body at trapezius muscle region.

The motion sensor unit 110 is provided with one or more sensors capable of providing motion data to the processor 105 to which it is connected, and the processor 105 are configured to keep track of subsequent three dimensional positions of the motion sensor unit 110. The sensor unit may be a small unit such as a MEMS unit providing accelerometer data allowing the processor to calculate position and velocity data of the motion sensor unit without the need for external references. A commercially available unit is the semiconductor motion tracker device MPU-9250 from INVENSENSE, San Jose, Calif. The system may further comprise wireless communication means, e.g. Bluetooth or WIFI enabling the processor 105 to communicate with the control unit 120.

Modes

In various embodiments the control unit can be used to set the system in one out of two modes, a threshold set mode and a supervision mode:

in the threshold set mode a first three dimensional track can be defined together with a threshold, also called allowable deviation which is a radius of a virtual tube created with a reference motion track as centre axis. Also attitude deviation parameters can be set in this mode.

Further, the system is configured such that it is possible to connect the control unit to the Internet and import a reference motion track and an allowable deviation. The control unit is also configured to facilitate adjustment of parameters of allowable deviation. Typical parameters of allowable deviation may include radius of an allowable tube, see FIG. 4b, and allowable attitude deviation angle(s) represented by cones of allowable attitude angles, and/or attitude angle intervals, see FIG. 4c. In various embodiments a desirable track, and/or desirable attitude angles may be predefined as a factory setting that may be adjusted by input of certain body measurements, such as e.g. fingertip to ground distance, and arm length, depending on motion to be practiced (trained).

In the supervision mode, the processor is configured to compare either the sensor unit position, or both sensor unit position and sensor unit attitude, with reference values. Regarding position, as long as the actual movement stays within the virtual tube, the motion is considered satisfactory and no stimulus will be elicited. Thus, depending on the motion sensor unit 110 movement relative to the reference movement, the processor should immediately send, to the stimulus unit a command to elicit a first stimulus, when the motion sensor unit has moved away further than the allowable deviation distance and/or the attitude has deviated outside an angular cone.

In various embodiments the processor is configured to accomplish a comparison with a predetermined motion only, and is not configured to be able to be set in any threshold or reference motion modes.

Stimulus Type

The stimulator 102 is preferably configured to provide a discouraging stimulus. The stimulus may be a tactile stimulus, electrical stimulus, light stimulus, auditory stimulus, heat stimulus, or cold stimulus, or a combination thereof. Depending on the needs of the user the stimulus can be selected to maximize motor learning. Preferably the stimulus elicited by the stimulus unit is an electric stimulus. Even more preferred, the stimulus unit is configured to be able to elicit an electric stimulus of such magnitude that it is perceived as painful to most humans. The stimulus unit is configured to be able to deliver such stimuli. The magnitude of the stimulus is adjustable.

The stimulus unit is configured to deliver the stimulus with very short delay, preferably, less than 50 milliseconds (ms), or more preferred less than 20 ms, or most preferred less than 10 ms.

Method for Training Correct Position

Figure 2A:
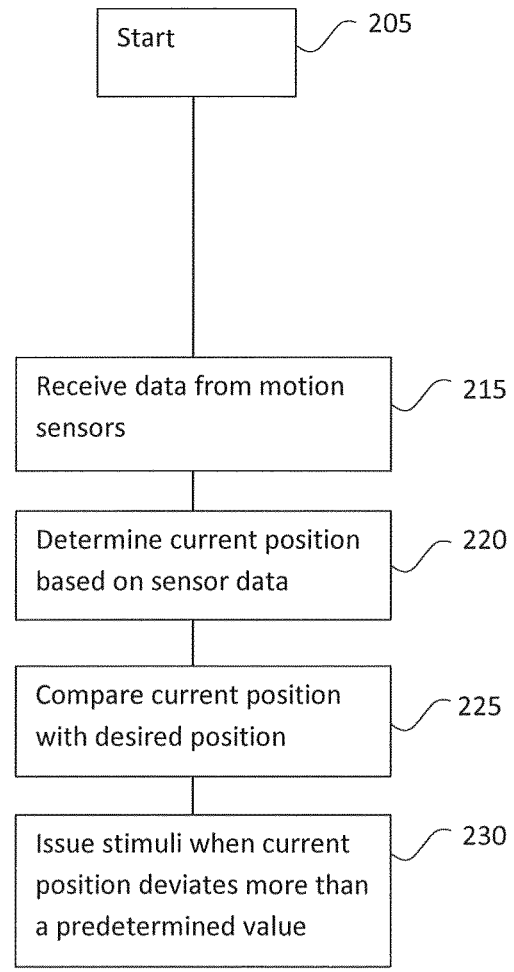
FIG. 2a shows a flow chart of a method for providing biofeedback to a person on a body motion.

Now referring to FIG. 2a, there is provided a method for a training aid for a person or animal provided with a motion sensor unit 110, in order to improve a body motion, the method comprising the steps of
receiving 215 motion sensor unit 110 data;
determining 220 the current position of the sensor unit based on sensor unit data;
comparing 225 the current motion position values of the sensor unit as determined with corresponding position values of a predetermined desired motion;
issuing 230 a stimulus based on the level of disagreement between the position values of the current motion and of the predetermined desired motion in view of a predetermined threshold value;
wherein the stimulus issued may be an electrical stimulus.

Figure 2B:
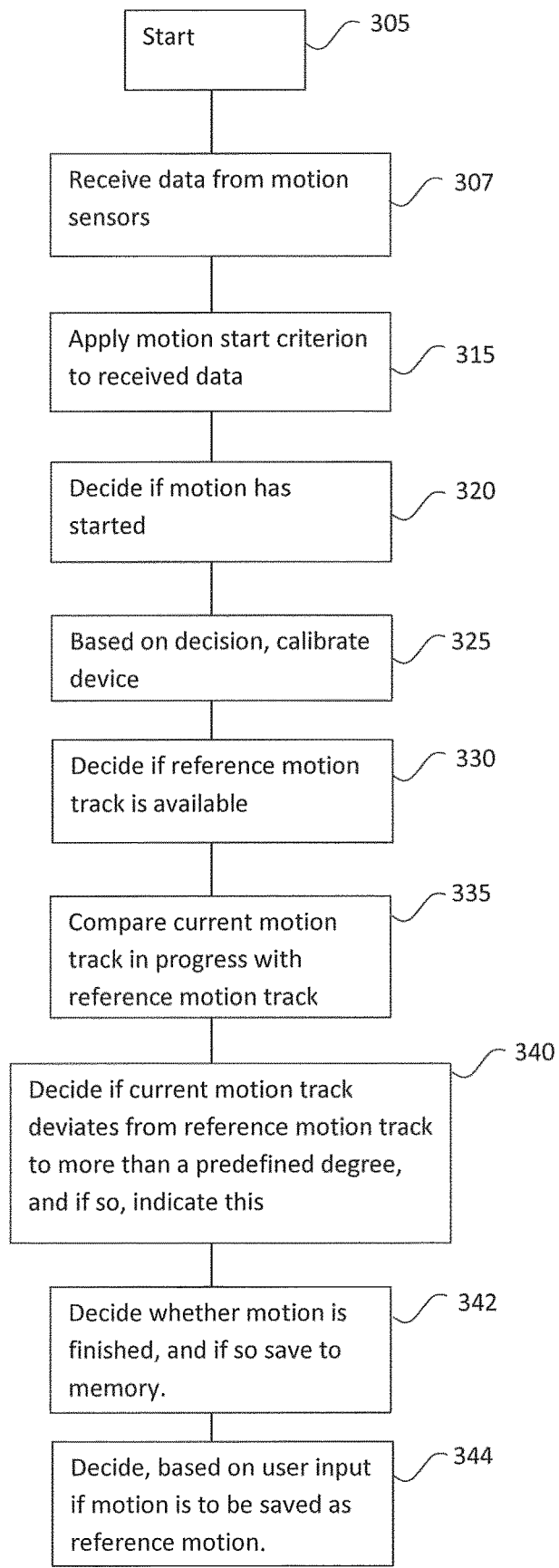
FIG. 2b shows a flow chart of another method for providing biofeedback to a person on a body motion.

Now referring to FIG. 2b, the method may comprise additional steps as illustrated. It is shown a flow chart of another method for providing biofeedback to a person on a body motion, the method comprising the steps of
initiating (306) internal motion registers for sensor unit position, velocity and attitude, see also paragraph below;
receiving 307 data from motion sensors;
applying 315 motion start criterion to received data, see below;

deciding 320 if motion has started;
calibrating 325 device based on decision of step 320, see below;
deciding 330 if reference motion track is available;
comparing 335 current motion track in progress with reference motion track;
deciding 340 if current motion track deviates from reference motion track to more than a predefined degree, and if so, indicate this;
deciding 342 whether motion is finished, and if so save to memory;
deciding 344 based on user input if motion track is to be saved as a reference motion track.

Method for Training Correct Attitude Angles

Figure 4D:
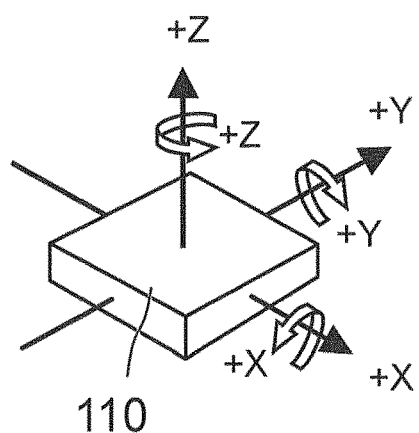
FIG. 4d shows a schematic perspective view of a motion sensor unit with reference directions
Figure 4D:
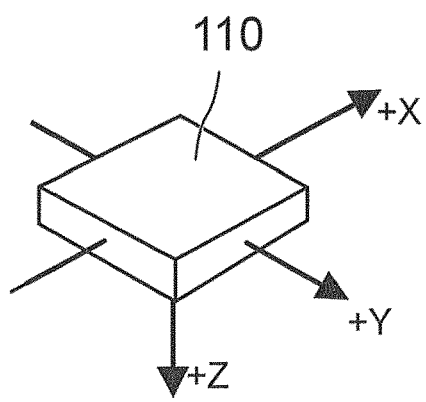
Figure 4A:
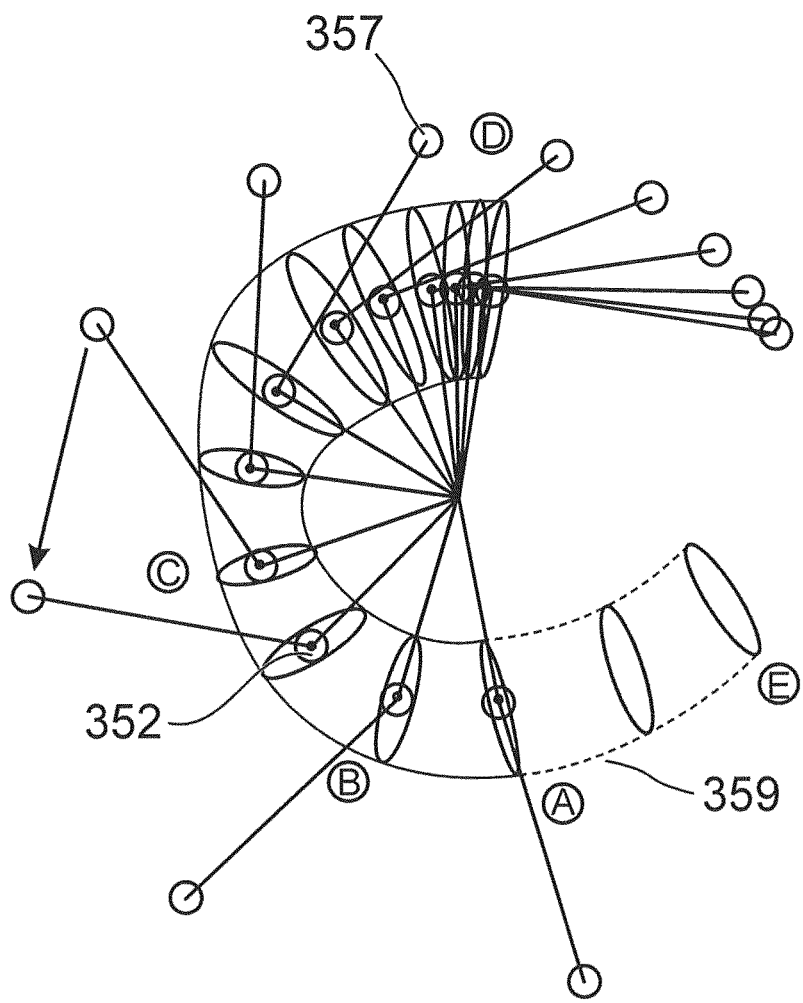
FIG. 4a shows a schematic representation as seen from above of a golf swing as consecutive positions of the club and wrist superimposed together with a tube of allowed deviation.
Figure 4B:
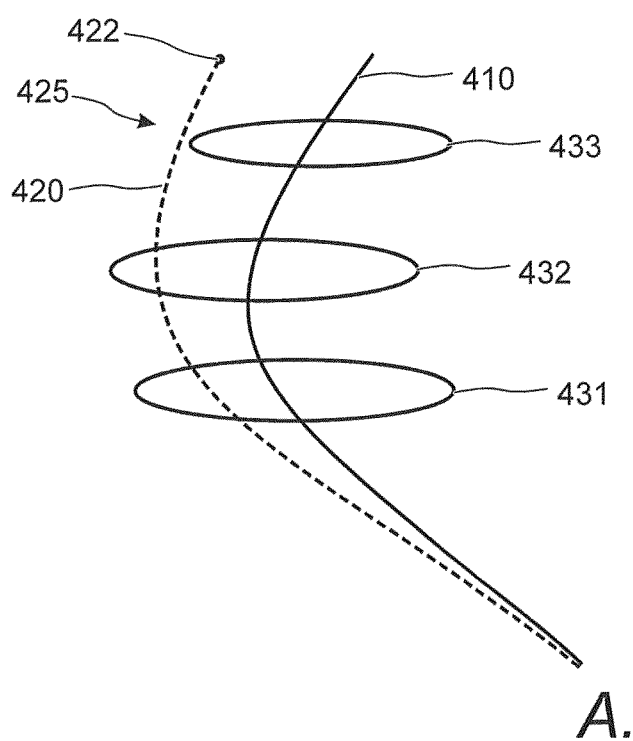
FIG. 4b shows a detail of a virtual tube of allowed deviation.
Figure 4C:
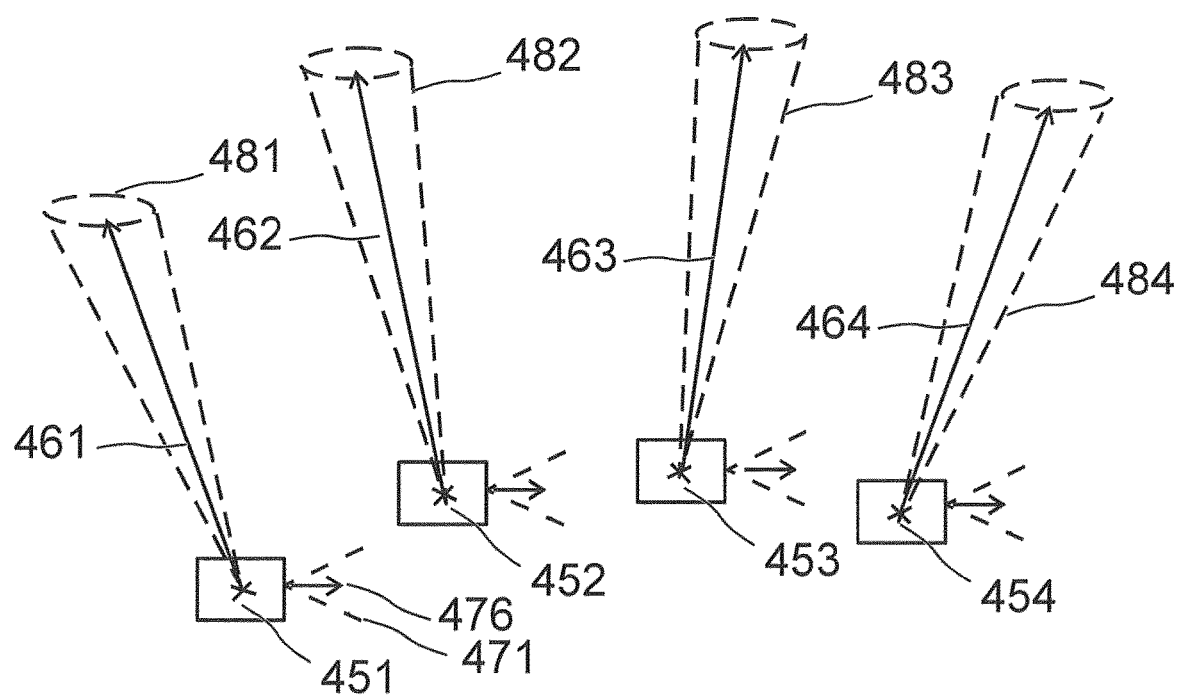
FIG. 4c shows a few sample points of a motion together with directional vectors of each point and limit cones/sectors for the directional vectors.
Figure 5:
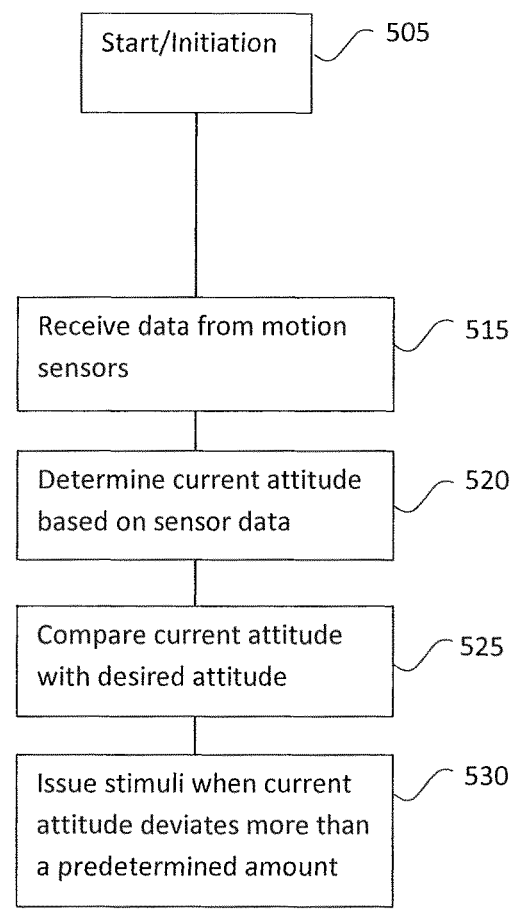
FIG. 5 shows a flow chart of a method for providing biofeedback to a person on a body motion, using attitude directional vectors.
Figure 6:
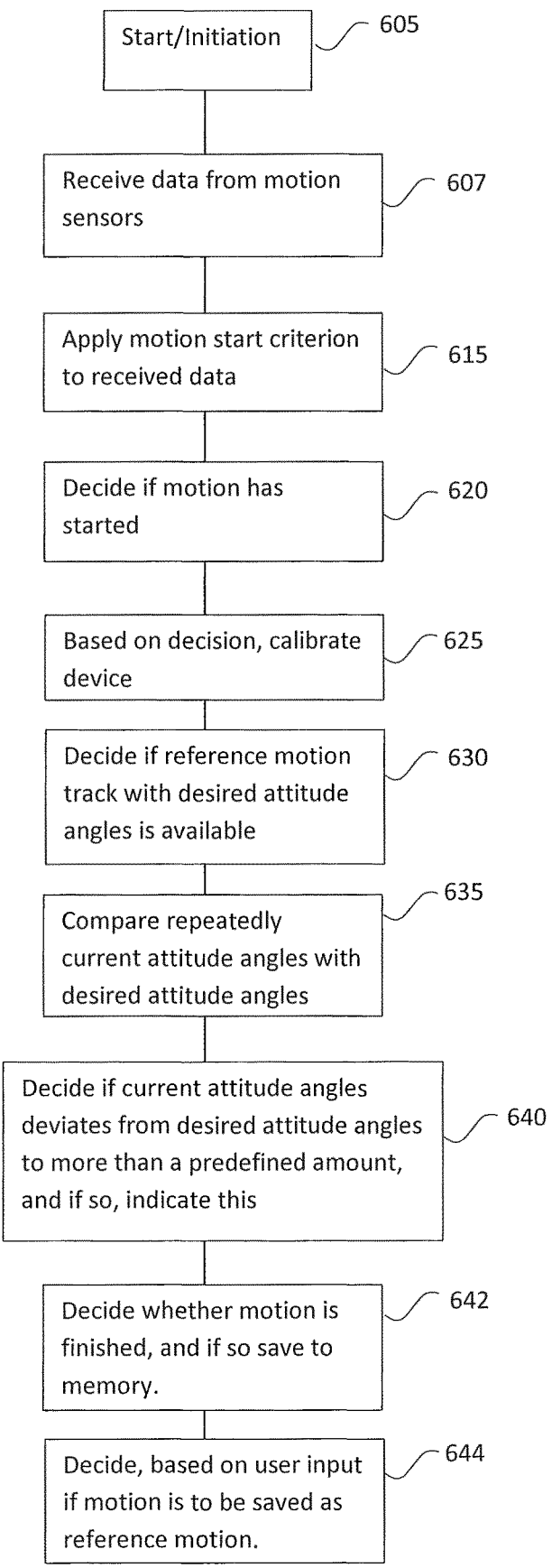
FIG. 6 shows a flow chart of another method for providing biofeedback to a person on a body motion, using attitude directional vectors.

Now referring to FIGS. 5 and 6 there is further provided a method for a training aid for a person or animal provided with a motion sensor unit 110, in order to improve a body motion, the method comprising the steps of
receiving 515 motion sensor unit 110 data;
determining 520 the current attitude of the sensor unit based on sensor unit data;
comparing 525 the current motion attitude values of the sensor unit as determined with corresponding attitude values of a predetermined desired motion;
issuing 530 a stimulus based on the level of disagreement between the attitude values of the current motion and of the predetermined desired motion in view of a triplet of predetermined threshold values, one for each attitude angle, or, e.g. as illustrated in FIG. 4c, in the form of a combination of an allowable cone 481-484 for an attitude vector 461-464 with its point in the current position and widening in the direction of the attitude vector, and a sector 471 of allowed third attitude angle for a an indicator 476 of a third attitude angle, and wherein the stimulus issued may be an electrical stimulus.

The method for training correct attitude angles may comprise additional steps as illustrated in FIG. 6, which shows a flow chart of another method for providing biofeedback to a person on a body motion, the method comprising the steps of
initiating 606 internal motion registers for sensor unit position, velocity and attitude;
receiving 607 data from motion sensors;
applying 615 motion start criterion to received data, see below;
deciding 620 if motion has started;
calibrating 625 device based on decision of step 620, see also below;
deciding 630 if reference motion track including desired attitude angles is available;
comparing 635 current attitude angles with reference motion track angles;
deciding 640 if current attitude angles deviates from attitude angles of a reference motion track more than desired (if outside the cone), and if so, indicate this;
deciding 642 whether motion is finished, and if so save the motion track to memory;
deciding 644 based on user input if motion track with attitude angles is to be saved as a reference motion track.

Initiation

The processor is preferably configured to perform an initiation procedure to reset motion registers holding values representing motion states of the motion sensor unit, the values may include position coordinates (x, y, z), speed values in x, y, z directions, and attitude angles, i.e. rotation angle around x, y, z coordinate axes for the motion sensor unit. The initial coordinate system is set in the directions of the motion sensor unit at initiation moment in time in order to provide future reference. Such initiation may be done by an external signal, pressing a button on the motion sensor or processor unit and/or keeping the sensor unit still within predetermined limits for a predetermined amount of time, such as 1-10 cm and at least 1 s in order to reset all the motion states mentioned above.

Motion Start Identification

Figure 4E:
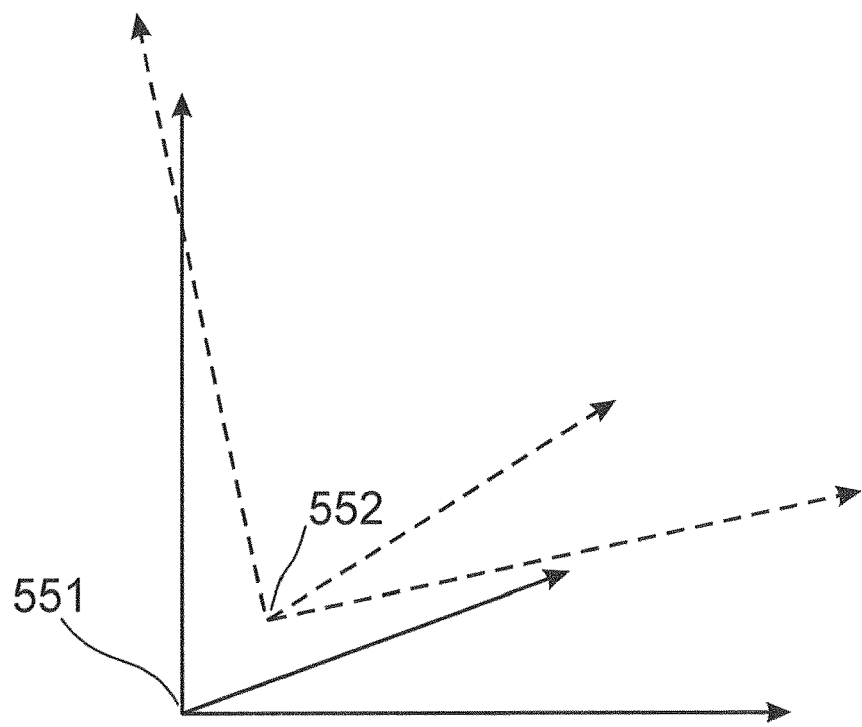
FIG. 4e shows a diagrammatic representation of two coordinate systems
Figure 4F:
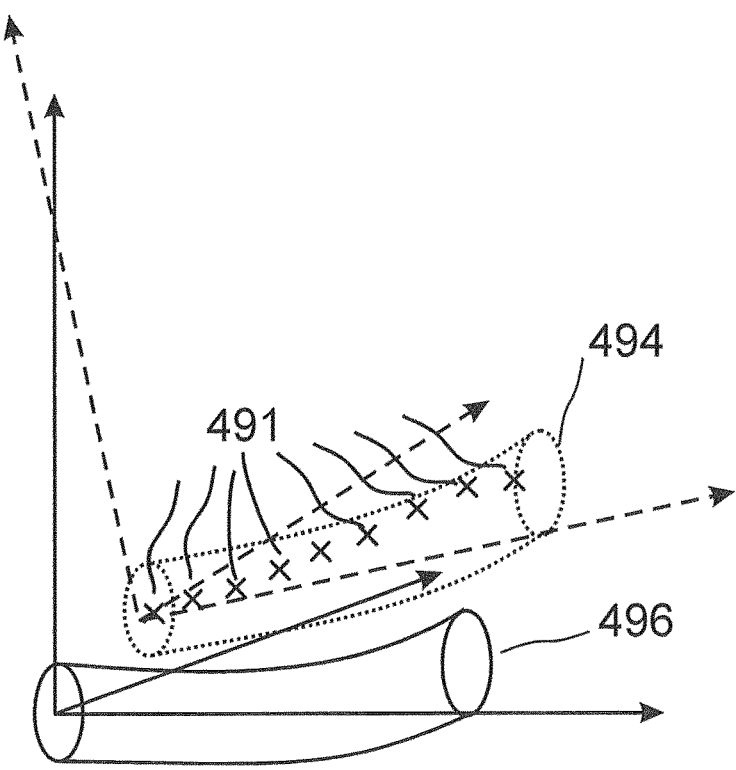
FIG. 4f shows the reference frames of FIG. 4e ready to be aligned using a motion start sequence

FIG. 4e shows a schematic view of two different reference frames/coordinate systems. FIG. 4f shows the reference frames of FIG. 4e ready to be aligned.

The processor is preferably configured to search for a motion start identifier, i.e., a short motion track portion (491). The processor is configured to align the short motion track portion (491) to fit in a virtual motion start tube 494. Subsequently the virtual motion start tube 494 is used to align the current reference frame having a second origin 552 to a reference motion reference frame having a first origin 551.

Another motion start identifier may be a predetermined attained speed of motion, signaling that motion has started and in what direction. The direction of the start sequence is preferably determined as direction of velocity vector at a predetermined absolute value of the attained velocity of motion of the motion sensor unit. This direction is then used to align reference motion track with current motion, as process here called calibration.

Virtual Tube and Allowable Deviation

The comparing of the sensor unit current position with the corresponding position values of a predetermined desired motion involves preferably the step of comparing the current position of the sensor unit as determined, with a nearest portion of a desired track representing consecutive position values of the desired motion, and wherein a deviation is determined as the calculated distance between the current position and the desired track, irrespective of a time stamp of the portion of the desired track closest to the current position.

FIG. 3a shows a perspective view of a golfer 350 swinging a club 355. FIG. 3b shows a perspective view of an athlete's body with attached devices. As a model it may be an advantage to think of the allowable space for the current motion as a virtual tube having a centre axis or centre curve corresponding to the desired track and a radius equivalent to a maximum allowable deviation.

An example of such a virtual tube, as illustrated for a golf swing is found in FIGS. 4a, 4b, and 4c. The tube centre axis follows the motion of the golfer's 350 wrist 352. In FIG. 4a is shown a swing with no deviation from the reference track, i.e., the motion is completely centred in the tube 359 of allowed motion. The reference letter "A" indicate start position, "B" indicates detection of movement as explained in the passage "Motion start identification" above. The letter "C" indicates a portion of the reference motion where the maximally allowed deviation is set to be less than in other portions. Letter "D" indicates top of backswing, start of downswing. "A", now on the way down, indicates hitting of ball, and "E" indicates end of tube of allowed motion. Passing the end of the tube indicates that motion is finished as expected and no feedback should be given. A "positive" feedback may be given here, such as e.g. a happy note.

FIG. 4b shows a detail of a virtual tube of allowed deviation. A reference track 410 defines together with allowable radiuses of circles 431-433 a tube. If a current motion 422 of a current track 420 deviates more than allowed as indicated at point 425, stimulus feedback is given.

Virtual Tube Varying Radius

The processor may be configured such that the virtual tube radius, i.e., the maximum allowable deviation is a function of time from a reference time or is a function of distance along the reference track, from its start. Certain passages of the movement may be assigned certain allowable deviation. The maximum allowable deviation can also be set arbitrarily for each point of the reference track.

Dynamic Adaptive Threshold

The processor may further be configured to provide a method for altering the allowable deviation dynamically, i.e., the processor keep track of subsequent motions, and if a number of motions has been performed in which no negative feedback has been issued, i.e., they have been successful, the processor decreases the allowable deviation to a value smaller than the current one, allowing the person to further fine tune the motion.

Angular cones-rotation angle deviations.

FIG. 4c shows a few sample points 451-454 of a motion together with attitude vectors 461-464 of each point and limit cones 481-484, and limit sectors for the attitude vectors 461-464. The processor 105 may be configured to, based on the level of disagreement between the attitude values of the current motion (the motion sensor unit) and of the predetermined desired motion in view of a triplet of predetermined threshold values, one for each attitude angle, or, e.g. as illustrated in FIG. 4c, in the form of a combination of an allowable cone 481-484 for an attitude vector 461-464 with its base in the current position and widening in the direction of the attitude vector, and a sector of allowed third attitude angle 471-474

Multiple sensor units

The system may be provided with more than one sensor unit, and the processor may be configured to handle two or more sensors and the relationship of their positions. This may allow for study of more than one body part simultaneously or in sequence. E.g. it should be possible to study both arm motion and hip motion, and their relation, if one sensor is attached to the arm and another sensor is attached to the hip.

For example, within the sport of golf, a common fault is to let the club or the arms initiate the downswing instead of the hips. Such a fault is called a timing failure or sometimes sequence failure. Such timing failures or sequence failures should be possible to correct with the aid of a device configured to have two or more sensor units that connect to different body parts and/or an implement, i.e. in a golf swing one sensor could be connected to the left wrist and another to the left hip. Movement sequence comparisons can then be made to initiate the correct downswing sequence.

LEGEND

101 Body motion capture device
105 Processor
110 Motion sensor unit
118 Memory
120 Control unit
205-230 Blocks of flowchart FIG. 2a
305-344 Blocks of flowchart FIG. 2b
350 Golfer's body
352 Wrist
355 Golf club
357 Golf club head
359 (Virtual) Tube of allowed motion
360 Track of golf club head (backswing)
362 Track of golf club head (downswing)
370 Body
371 Alternate or additional site of attachment of sensor unit 372 Bracelet with motion sensor unit
374 Attached Stimulator unit
376-378 Further alternate or additional sites of attachment of sensor unit and/or stimulator
410 Reference motion track
420 Current motion track
422 Current position
425 Event of breaking limit
431 Limit circle of virtual tube
432 Limit circle of virtual tube
433 Limit circle of virtual tube
441 Virtual tube
443 Reference track
451-456 Positions
461-465 Attitude vectors
471-474 Sector of allowed (third) attitude angle
476 Third attitude angle
481-484 Cone of allowed angle
491 Motion start sequence
551 An origin
552 Another origin
505-530 Blocks of flowchart FIG. 5
605-644 Blocks of flowchart FIG. 6
A. Start position
B. Detection of movement, end of start tube
C. Example of limited passage
D. Top of backswing, start of downswing
A. Hitting of ball
E. End of tube of allowed motion

The invention claimed is:

1. A motion training aid system for a person or animal, helping to perform or improve a body motion, the system comprising:
a motion sensor unit configured to be easily attachable to a body part of the person or to an implement used by said person;
a control unit or communication means for facilitating the communication with a control unit;
a processor;
a memory; and
a stimulator attachable to the body of the person, and upon receiving a command, capable of eliciting a stimuli perceptible by the person,
wherein the motion sensor unit is configured to provide motion data to the processor, and the processor is configured to determine, based on the motion data from the motion sensor unit, and keep track of subsequent three dimensional positions of the motion sensor unit,
wherein the processor is configured to compare the motion sensor unit position, as tracked by the processor, with a reference track stored in the memory, and depending on the motion sensor unit position relative to the reference track send to the stimulator, a command to elicit a stimulus when the motion sensor unit has reached a certain level of deviation from the reference track,
wherein the stimulus elicited by the stimulator is an electrical stimulus,
wherein the processor is configured to search for a motion start identifier to determine a precise starting time of the body motion, and
wherein the comparison of the motion sensor unit position, as tracked by the processor, with a reference track stored in the memory, is performed with the aid of a virtual tube, the virtual tube being provided with dynamically adaptive radius.

2. The system according to claim 1, wherein the processor is configured to also, or as an alternative, compare motion sensor attitude angles with reference angles.

3. The system according to claim 1, wherein the electrical stimulus is arranged to be so strong that it is perceived as painful by some or most persons.

4. The system according to claim 1, wherein the stimulus is elicited with a delay of less than 50 milliseconds (ms), or less than 20 ms, or less than 10 ms.

5. The motion training aid system according to claim 1, wherein the motion sensor unit is configured to provide motion data to the processor, and the processor is configured to determine, based on the motion data from the motion sensor unit, and keep track of subsequent attitude angles of the motion sensor unit, and wherein the processor is configured to compare the motion sensor unit attitude angles, as the motion continues, with reference attitude angles in the memory representing a desired motion, and depending on the degree of agreement or disagreement send to the stimulator, a command to elicit a stimulus when the motion sensor unit has reached a certain level of deviation from the reference motion attitude angles.

6. The motion training aid system according to claim 1, wherein the motion sensor unit is configured to provide motion data to the processor, and the processor is configured to determine, based on the motion data from the motion sensor unit, and keep track of subsequent motion parameters of the motion sensor unit, and wherein the processor is configured to compare the motion sensor unit motion parameters, as the motion continues, with reference motion parameters in the memory representing a desired motion, and depending on the degree of agreement or disagreement send to the stimulator, a command to elicit a stimulus when the motion sensor unit has reached a certain level of deviation from the reference motion parameter(s).

7. The motion training aid system of claim 1, wherein the processor is configured to receive and process movement signals from the motion sensor unit adapted to be attached to a wrist of the person.

8. The motion training aid system of claim 1, wherein the processor is configured to receive and process movement signals from the motion sensor unit adapted to be attached to the implement used by the person.

9. A method for a training aid for a person provided with a motion sensor unit in order to improve a body motion, the method comprising:
receiving motion sensor unit data;
determining the current position of the sensor unit based on sensor unit data;
comparing the current motion position values of a current track of the motion sensor unit as determined with corresponding position values of a predetermined desired motion of a desired track corresponding to a reference motion track; and
issuing a stimuli based on the level of disagreement between the position values of the current motion and of the predetermined desired motion,
wherein the comparison of the motion sensor unit position with a reference motion track stored in a memory, is performed with the aid of a virtual tube, the virtual tube being provided with a dynamically adaptive radius.

10. The method of claim 9, wherein the comparing of the current motion position values of the sensor unit as determined with the corresponding position values of a predetermined desired motion involves comparing the current position of the sensor unit as determined with a reference motion representing consecutive position values of the desired motion, and wherein a deviation is determined as the calculated distance between the current position and the desired track, and wherein a stimulus is issued only if the deviation becomes greater than a predetermined maximally allowed deviation before the end of the reference motion track is reached.

* * * * *